United States Patent [19]

Baughman

[11] 4,350,900
[45] Sep. 21, 1982

[54] WIND ENERGY MACHINE

[76] Inventor: Harold E. Baughman, P.O. Box 6506, Santa Rosa, Calif. 95406

[21] Appl. No.: 205,428

[22] Filed: Nov. 10, 1980

[51] Int. Cl.$^3$ .............................................. F03D 7/06
[52] U.S. Cl. ...................................... 290/55; 290/44; 415/2 R
[58] Field of Search ...................... 290/43, 44, 54, 55; 415/2; 416/179, 183, 185

[56] References Cited

U.S. PATENT DOCUMENTS

| | | | |
|---|---|---|---|
| 1,105,846 | 8/1914 | Schneider | 290/55 X |
| 1,315,595 | 9/1919 | Clark | 290/55 |
| 4,047,833 | 9/1977 | Decker | 290/55 X |
| 4,061,926 | 12/1977 | Peed | 290/55 |
| 4,076,448 | 2/1978 | Sanders, Jr. | 415/2 |
| 4,084,918 | 4/1978 | Paulecka | 290/55 X |
| 4,115,027 | 9/1978 | Thomas | 290/55 X |
| 4,134,710 | 1/1979 | Atherton | 290/55 X |
| 4,142,822 | 3/1979 | Herbert et al. | 290/55 X |
| 4,168,439 | 9/1979 | Palma | 290/44 |

Primary Examiner—J. V. Truhe
Assistant Examiner—W. E. Duncanson, Jr.
Attorney, Agent, or Firm—Melvin R. Stidham

[57] ABSTRACT

A rotary machine to be driven by a flow stream, such as wind or a water stream, including a housing with a semi-cylindrical back wall and horizontal top and bottom walls. A plurality of intake ducts open across the front of the housing to direct flow against a plurality of vertical vanes carried on and around a cylindrical rotor within the housing. The ducts on one side of the front-to-back centerline project air streams directly in, in the direction of rotation, while those on the other side of the centerline reverse the stream so that they will also impinge upon the vanes in the same rotational direction. The vanes are configurated as airfoils so that, in addition to the reaction to the flow impingement, there will be a lift vector in the direction of rotation. In one embodiment, the airfoil vanes are disposed in rows of two or more from outside to inside, closely spaced to form venturi slots between them.

5 Claims, 7 Drawing Figures

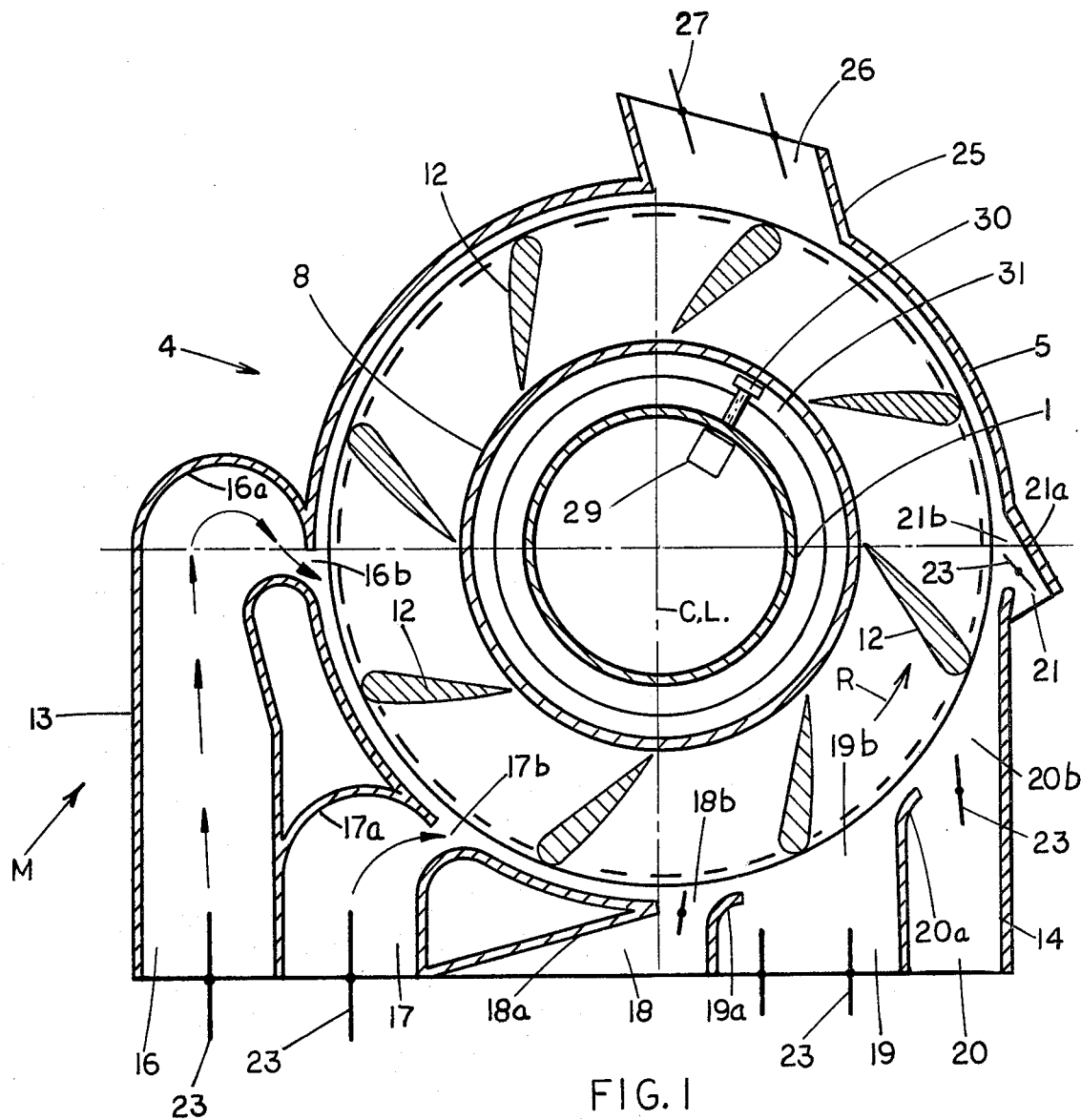
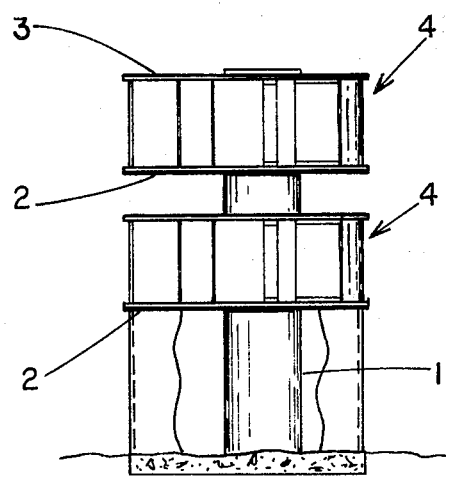
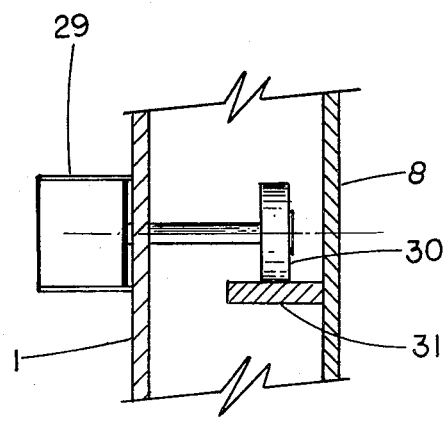
FIG. 1
FIG. 6
FIG. 5

WIND ENERGY MACHINE

BACKGROUND OF THE INVENTION

In the current energy crisis, strenuous efforts are being made to produce energy without requiring consumption of natural resources. Considerable research and development efforts have been expended in attempts to utilize solar energy and energy generated by wind and water flow. Water wheels and squirrel cage type fans suffer the disadvantage in that only those blades on the side moving with the wind can be utilized, while the blades moving in the opposite direction have to be shrouded. Large propeller type fans rotating in a vertical plane have been tested and tried for production of energy, but they too suffer a number of disadvantages. First, for practical purposes, they must be of considerable diameter for effective energy production. This results in tremendous centrifical forces which may cause vibration and even twisting or crystalization of metal propeller blades and/or destruction of the supporting tower. Even in absence of damage, large propellers tend to be noisy and are, therefore, objectional in a community. Moreover, the large propellers require high towers to provide ample clearance under the propeller tips and such are commonly deemed unslightly and objectionable for community use.

OBJECTS OF THE INVENTION

It is an object of this invention to provide a wind energy machine which is simple and compact.

It is a further object of this invention to provide a stable, flow stream-actuated machine.

It is a further object of this invention to provide a flow stream driven machine which makes optimum use of the flow energy available.

Other objects and advantages of this invention will become apparent from the description to follow, particularly when read in conjunction with the accompanying drawings.

SUMMARY OF THE INVENTION

In carrying out this invention, I provide a cylindrical rotor on a vertical axis with top and bottom radial flanges which support between them, vertical vanes of airfoil configuration. The cylinder is carried in a housing which is generally semi-cylindrical at the back portion then projects forward to present wide duct openings at the front. The ducts on one side of the front-to-back centerline project streams in the direction of rotation along a chord of the front quadrant on that side of the centerline. The ducts on the other side of the centerline are curved back to project streams more or less forwardly along chords in the same direction of rotation. The airfoil vanes are disposed so that in addition to the usual reactive forces, there is a vector of airfoil lift, or its horizontal equivalent, in the direction of rotation. The housing may be mounted on a cylindrical central column and wheels on the rotor run around a circular track on the bottom wall of the housing. A generator may be carried on the central column with a wheel engaging the rotor so that the generator is driven thereby.

BRIEF DESCRIPTION OF THE DRAWINGS

In the drawings:

FIG. 1 is a horizontal section in view of the flow stream actuated machine of this invention;

FIG. 5 is an enlarged partial section view of an electricity generator forming a part of this invention;

FIG. 6 is an elevation view of another embodiment of this invention.

DESCRIPTION OF PREFERRED EMBODIMENTS

The Embodiment of FIGS. 1 to 5

Figure 2:
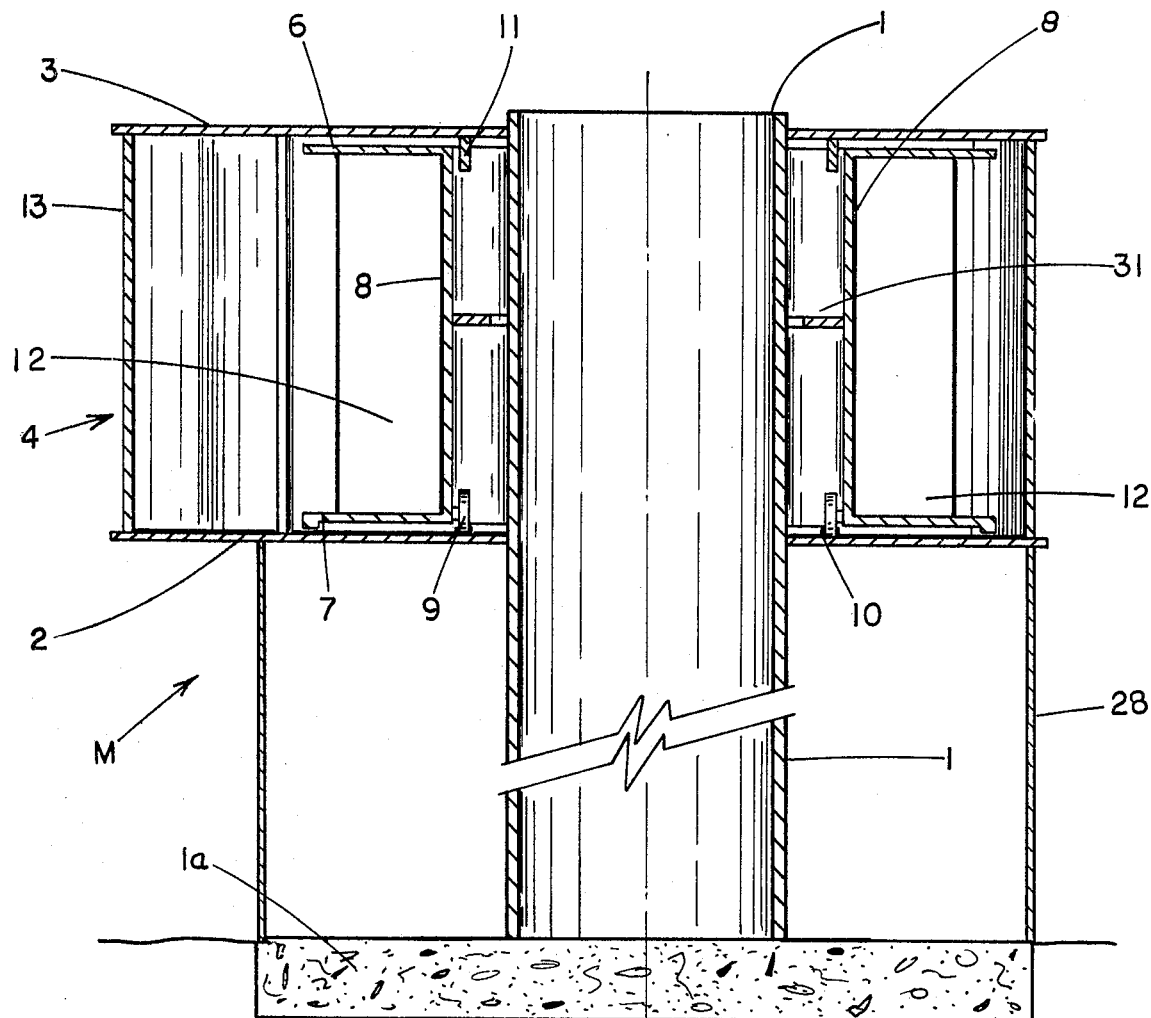
FIG. 2 is a vertical section view of the machine.
Figure 3:
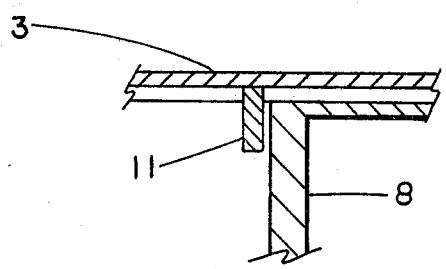
FIG. 3 is an enlarged partial section view of a rotor guide.
Figure 4:
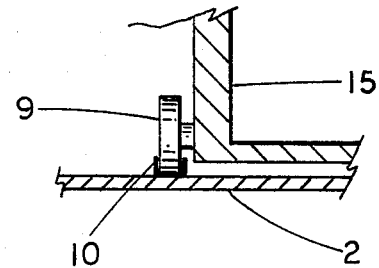
FIG. 4 is an enlarged partial section view of the rotor support.
Figure 7:
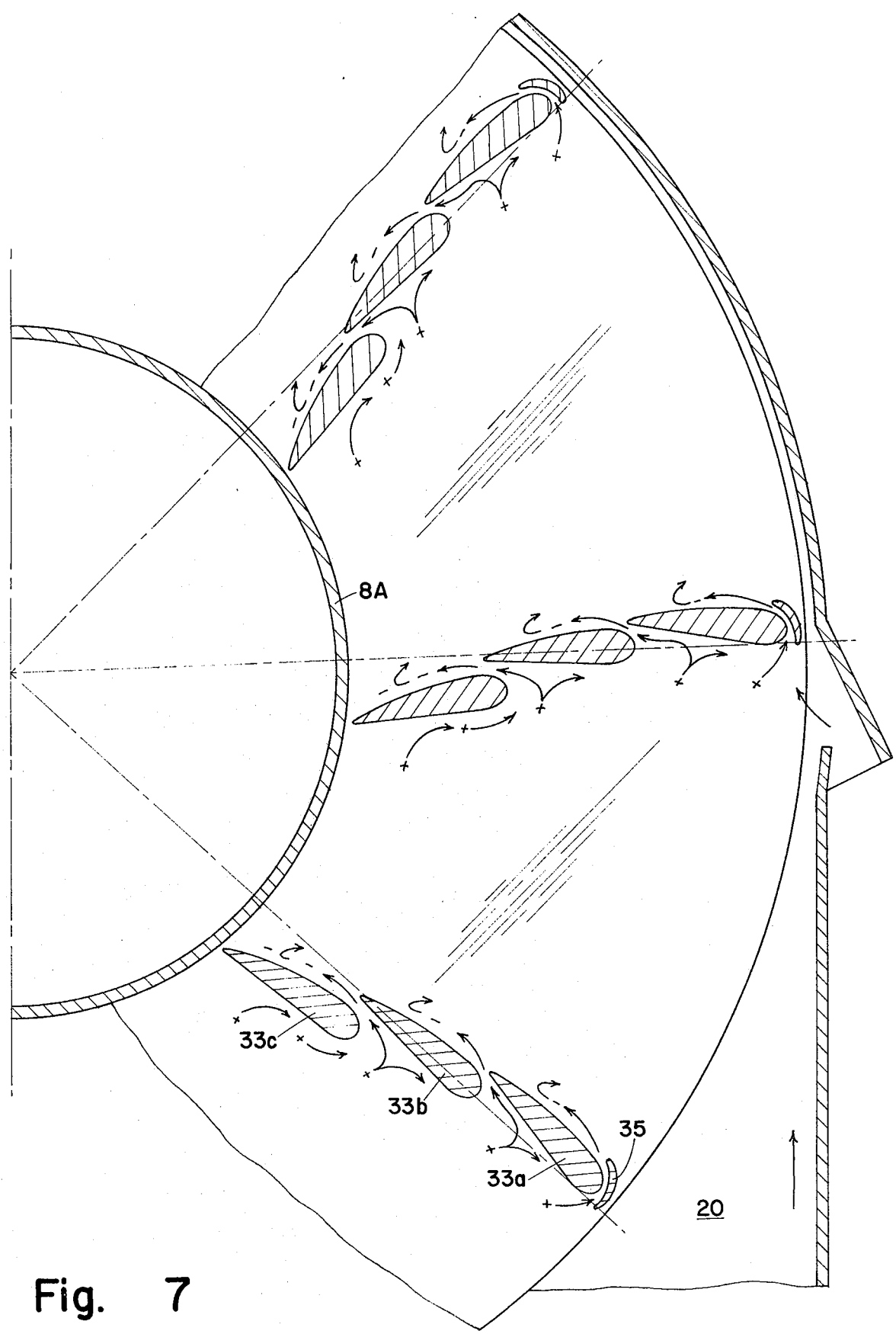
FIG. 7 is an enlarged partial section view of another embodiment of this invention.

Referring now to FIGS. 1 and 2 with greater particularity the flow stream driven machine M of this invention includes a central, cylindrical support column 1 which may be firmly anchored in a concrete base 1a. When used as a wind machine, the column 1 may be of any desirable height. Preferably high enough to clear any obstructions to the prevailing wind. Carried at the top of the column 1 are the bottom 2 and top wall 3 of a housing 4.

As noted in FIG. 1, the back wall 5 of the housing is semi-cylindrical to closely embrace the edges of the top and bottom radial flanges 6 and 7 of a generally cylindrical rotor 8. The rotor has wheels 9 which roll in and around a circular track 10 carried on the bottom wall 2 of the housing, and depending from the upper wall 3 of the housing 4 is an annular guide rail 11 which aids in keeping the rotor 8 concentric about the central column 1. Supported on the rotor 8 between the top and bottom flanges 6 and 7 is a series of vanes 12 which may be of any suitable airfoil configuration so that air flowing over the leading surface in the direction of rotation produces an increment of lift or its horizontal equivalent in that direction, to augment the reactive forces of the flow stream engaging the vane.

The semi-cylindrical back wall 5 of the housing 4 merges into the projecting outer walls 18 and 14 of a plurality of ducts 16, 17, 18, 19, 20 and 21, with an airflow entry dividing head 18a separating the ducts 16 and 17 from the others. Each duct is provided with a louver or damper 23 so that the amount of windflow can be controlled of even shut off.

The various ducts 16 to 21 have deflecting surfaces 16a to 21a which deflect the wind to impinge upon the rotor vanes 12 in a tangential or chordal direction. On the right hand side of the front to back centerline C.L. the surfaces 18a, 19a, 20a and 21a are directed to guide the wind stream into the right front quadrant of the rotor 8 in a tangential direction in the direction of rotation indicated by the arrow R. To the left of the centerline C.L. the guiding surfaces 16a and 17a bend back so that the wind current will be deflected back to impinge upon the rotors in the left front quadrant in a tangential direction but still in the direction of rotation. Thus, it will be seen that the full frontal area from side 13 to opening 21, extending over a width greater then the diameter of the rotor 8 and over its full height, is used effectively to drive the rotor 8 in the same rotary direction R. The stream impinges upon the vanes 12 to drive the rotor 8 in reaction and, in addition, as the wind passes over the leading surface of the airfoil rotors 12, horizontal "aerodynamic lift" forces are added to augment the drive. This continues as the rotors progressively pass by duct throats 16b to 21b, and the wind stream carries the rotor 8 around and exits at outlet duct 26 which may also be provided with louvers 27 to control outlet flow. For cosmetic purposes, and to serve as a storage and/or work area, a shroud 28 may be provided below the assembly 4.

Referring now to FIGS. 1 and 5, one or more generators 29 may be mounted on a central column 1, each with a drive wheel 30 thereon riding along a ring 31 on the rotor 8 so that, as the rotor 8 revolves, the generator wheel is driven to generate electricity. If desired, the generator wheel 30 may have tires or the like to ensure positive drive.

THE EMBODIMENT OF FIG. 6

Two or more of the housing assemblies 4 may be mounted on a single column 1 to increase energy output. Each unit 4 has its own generator and operates independently of the others. Further, while we have described the production of electricity by use of a generator unit is also possible that the central column itself could be rigged and wired as a stator and the rotor rigged and wired as the rotor component of a generator to function as a generator itself.

THE EMBODIMENT OF FIG. 7

In this embodiment, the rotor 8A has a series of rows of vanes 33a, 33b and 33c with a slat 35 at the periphery of the rotor to guide a portion of the air stream over the leading surface of the outer vane to produce horizontal "lift". The vanes are disposed so that wind currents passing under the outer vane 33a will pass over the top of the second vane 33b to produce aerodynamic lift there. Likewise, a stream passing under the second rotor 33b will pass over the top of the third rotor 33c for more aerodynamic lift in the direction of rotation. Thus all three rotors are driven reactively by the wind stream, as well as our aeordynamically by virtue of the airfoil configuration. In addition, the airfoil vanes 33a, 33b and 33c are spaced closely so that there is, in effect, a slot or venturi which increases the velocity of the stream and reduces pressure above the trailing airfoil enhancing the rotary drive.

OTHER EMBODIMENTS

This invention has been described primarily as a stationary machine for producing energy from the wind. However, its utility is not so limited. For example, a unit 4 could be mounted at the front of a truck trailer, which impacts the wind, to generate electricity for refrigeration equipment, hoists and other auxiliary systems. A unit could be installed on a boat, particularly a sailboat, to produce power for all electrical equipment. The utility of this invention is not confined to the production of electricity; it could be mounted on a tall building to pump water to the upper levels or otherwise be utilized as a prime mover in a mechanical drive. The weight of the rotor 8 with vanes 12 would produce a fly wheel effect, and this could be intensified by weighting the outer edges of the rotor 8. Further the unit 4 could be anchored to be driven by a rapidly flowing water stream for any of the purposes herein contemplated.

While this invention has been described in conjunction with preferred embodiments thereof, it is obvious that modifications and changes therein may be made by those skilled in the art to which it pertains, without departing from the spirit and scope of this invention, as defined by the claims appended hereto.

What is claimed as invention is:

1. A rotary machine driven by a flowstream comprising:
   a housing having a semi-cylindrical back wall, horizontal top and bottom walls, and a plurality of intake ducts opening across the front thereof;
   a cylindrical rotor in said housing;
   a plurality of vertical vanes carried on and around said rotor to extend outward therefrom and spaced closely at their ends to said top and bottom walls;
   those ducts opening into said housing on one side of a front to back centerline of said rotor being formed and disposed to direct flow in a rotational direction generally along a chord of the front quadrant of said rotor on said one side, while those ducts on the other side are curved and disposed to bend the stream and direct flow back in said rotational direction generally along a chord of the front quadrant of said rotor on the other side of said centerline;
   said vanes being of airfoil configuration and being disposed so that flow over said vanes as directed from said ducts creates aerodynamic forces in said direction of rotation; and
   a plurality of vertical louvers in said ducts pivoted between said top and bottom walls.

2. The rotary machine defined by claim 1 including:
   a circular track around said bottom wall; and wheels on said rotor rolling on said track.

3. The rotary machine defined by claim 1 including:
   a central cylindrical column supporting said housing above the ground in an air stream;
   means on said housing and said rotor cooperatively associated to generate electricity.

4. The rotary machine defined by claim 1 including:
   top and bottom radial flanges on said rotor supporting said vanes.

5. A rotary machine driven by a flowstream comprising:
   a housing having a semi-cylindrical back wall, horizontal top and bottom walls, and a plurality of intake ducts opening across the front thereof;
   a cylindrical rotor in said housing; and
   a plurality of vertical vanes carried on and around said rotor to extend outward therefrom and spaced closely at their ends to said top and bottom walls;
   those ducts opening into said housing on one side of a front to back centerline of said rotor being formed and disposed to direct flow in a rotational direction generally along a chord of the front quadrant of said rotor on said one side, while those ducts on the other side are curved and disposed to bend the stream and direct flow back in said rotational direction generally along a chord of the front quadrant of said rotor on the other side of said centerline;
   said vanes being of airfoil configuration and being disposed so that flow over said vanes as directed from said ducts creates aerodynamic forces in said direction of rotation;
   said vanes being arranged in a series of rows thereof;
   each row being disposed from the outside toward the inside of said flanges with a narrow spacing between the trailing edge of one airfoil and the leading edge of the next forming an air velocity increasing slot.

* * * * *